(12) United States Patent
Lehuu et al.

(10) Patent No.: US 9,956,664 B2
(45) Date of Patent: May 1, 2018

(54) ABRASIVE ELEMENT PRECURSOR WITH PRECISELY SHAPED FEATURES AND METHODS OF MAKING THEREOF

(71) Applicant: 3M INNOVATIVE PROPERTIES COMPANY, St. Paul, MN (US)

(72) Inventors: Duy K. Lehuu, Lake Elmo, MN (US); Noah O. Shanti, St. Paul, MN (US); Junqing Xie, Woodbury, MN (US); Kathryn R. Bretscher, Minnetonka, MN (US); Vincent W. Nehring, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days. days.

(21) Appl. No.: 14/418,960

(22) PCT Filed: Jul. 31, 2013

(86) PCT No.: PCT/US2013/052817
§ 371 (c)(1),
(2) Date: Feb. 2, 2015

(87) PCT Pub. No.: WO2014/022453
PCT Pub. Date: Feb. 6, 2014

(65) Prior Publication Data
US 2015/0209933 A1 Jul. 30, 2015

Related U.S. Application Data

(60) Provisional application No. 61/678,661, filed on Aug. 2, 2012.

(51) Int. Cl.
*B24B 53/017* (2012.01)
*B24D 3/28* (2006.01)
(Continued)

(52) U.S. Cl.
CPC .......... *B24B 53/017* (2013.01); *B24B 37/245* (2013.01); *B24B 37/26* (2013.01);
(Continued)

(58) Field of Classification Search
CPC ........ B24B 53/017; B24B 37/245; B24D 3/28
See application file for complete search history.

(56) References Cited

U.S. PATENT DOCUMENTS 3,765,300 A * 10/1973 Taylor ................... C04B 35/563
109/82
4,741,597 A * 5/1988 Broer ................... C03C 25/1065
385/141
(Continued)

FOREIGN PATENT DOCUMENTS

JP H05-177550 7/1993
JP 3261687 3/2002
(Continued)

OTHER PUBLICATIONS

European Search Report for EP Application No. 13826485 dated Apr. 14, 2016, 7 pages.
(Continued)

*Primary Examiner* — Pegah Parvini
(74) *Attorney, Agent, or Firm* — Adam Bramwell; Jeffrey S. Kollodge (57) ABSTRACT

An abrasive element precursor includes a green body ceramic element having a first major surface, a second major surface, a plurality of inorganic particles, and a binder. At least the first major surface comprises a plurality of precisely shaped features. The plurality of inorganic particles is at least about 99% carbide ceramic by weight.

26 Claims, 5 Drawing Sheets

(51) Int. Cl.
*B24B 37/24* (2012.01)
*B24B 37/26* (2012.01)
*C04B 35/565* (2006.01)
*C04B 35/634* (2006.01)
*B28B 7/00* (2006.01)

(52) U.S. Cl.
CPC .............. *B24D 3/28* (2013.01); *B28B 7/0064* (2013.01); *C04B 35/565* (2013.01); *C04B 35/634* (2013.01); *C04B 2235/3821* (2013.01); *C04B 2235/604* (2013.01); *C04B 2235/6587* (2013.01); *C04B 2235/77* (2013.01); *C04B 2235/786* (2013.01); *C04B 2235/94* (2013.01)

(56) References Cited

U.S. PATENT DOCUMENTS

| | | |
|---|---|---|
| 5,152,917 A | 10/1992 | Pieper |
| 5,435,816 A | 7/1995 | Spurgeon |
| 5,453,312 A | 9/1995 | Hass et al. |
| 5,549,961 A | 8/1996 | Haas |
| 5,692,950 A | 12/1997 | Rutherford |
| 6,007,407 A | 12/1999 | Rutherford |
| 6,021,559 A | 2/2000 | Smith |
| 6,076,248 A | 6/2000 | Hoopman |
| 6,364,749 B1 | 4/2002 | Walker |
| 6,368,198 B1 | 4/2002 | Sung |
| 6,439,986 B1 | 8/2002 | Myoung |
| 6,632,127 B1 | 10/2003 | Zimmer |
| 6,642,127 B2 | 11/2003 | Kumar |
| 6,699,106 B2 | 3/2004 | Myoung |
| 6,818,029 B2 | 11/2004 | Myoung |
| 7,089,081 B2 | 8/2006 | Palmgren |
| 7,367,875 B2 | 5/2008 | Slutz |
| 2003/0109204 A1 | 6/2003 | Sung |
| 2006/0130627 A1 | 6/2006 | Matsuki |
| 2007/0077874 A1 | 4/2007 | Ataka |
| 2007/0254560 A1 | 11/2007 | Woo |
| 2008/0153398 A1 | 6/2008 | Sung |
| 2008/0233845 A1 | 9/2008 | Annen |
| 2009/0068937 A1 | 3/2009 | Sung |
| 2009/0093195 A1 | 4/2009 | Sung |
| 2009/0123705 A1 | 5/2009 | Sung |
| 2009/0123795 A1 | 5/2009 | Chuah |
| 2009/0163127 A1 | 6/2009 | David |
| 2009/0176443 A1 | 7/2009 | Kollodge |
| 2009/0224370 A1 | 9/2009 | Slutz |
| 2010/0146867 A1 | 6/2010 | Boden |
| 2010/0248596 A1 | 9/2010 | Sung |
| 2010/0330886 A1 | 12/2010 | Wu |
| 2011/0183142 A1 | 7/2011 | Gebhardt |
| 2011/0250826 A1 | 10/2011 | Yoon |
| 2012/0149283 A1 | 6/2012 | Schwappach |
| 2012/0171935 A1 | 7/2012 | Ruland |

FOREIGN PATENT DOCUMENTS

| | | |
|---|---|---|
| JP | 2003-103464 | 4/2003 |
| JP | 2010-221386 | 10/2010 |
| JP | 2011-161584 | 8/2011 |
| KR | 2009-0013369 | 2/2009 |
| KR | 10-0887979 | 3/2009 |
| KR | 101020870 | 3/2010 |
| WO | WO 2007/127549 | 11/2007 |
| WO | WO 2009-043058 | 4/2009 |
| WO | WO 2009-064345 | 5/2009 |
| WO | WO 2010-063647 | 6/2010 |
| WO | WO 2011-028700 | 3/2011 |
| WO | WO 2014-022462 | 2/2014 |
| WO | WO 2014-022465 | 2/2014 |

OTHER PUBLICATIONS

Gahlin, "Designed abrasive diamond surfaces", Wear, 1999, vol. 233-235, pp. 387-394.

Kim, "Novel CVD diamond-coated conditioner for improved performance in CMP processes", International Journal of Machine Tools and Manufacture, 2011, vol. 51, No. 6, pp. 565-568.

Lee, "Deposited CVD Diamond CMP Pad Conditioner for Metal CMP", International Conference on Planarization/CMP Technology, Nov. 19-21, 2009, pp. 432-436.

Park, "Physical and Chemical Characteristics of the Ceramic Conditioner in Chemical Mechanical Planarization", Key Engineering Materials, 2003, vol. 238-239, pp. 223-228.

Sung "Tailored Macroporous SiCN and SiC Structures for High-Temperature Fuel Reforming", Advanced Functional Materials, 2005, vol. 15, pp. 1336-1342.

Sung, "The in-Situ Dressing of CMP Pad Conditioners With Novel Coating Protection", Materials Science Forum, 2007, vol. 534-536, pp. 1133-1136.

Yasuda, "Development of Arrayed Micro Pattern on Polishing Pad Surface Applied with Anisotropic Etching", International Conference on Planarization/CMP Technology, Nov. 19-21, 2009, pp. 461-466.

Zabasajja et al., "A Novel Diamond Thing Film Pad Conditioner for Cu Barrier CMP Applications", 3M Company, 12 pages.

Zabasajja et al., "Pad Conditioning for Next Generation CMP Applications", 3M Company, 13 pages.

Zhang, "Fabrication of SiC Ceramics with Micropatterns from a Facile Replication Process", International Journal of Applied Ceramic Technology, 2012, vol. 9, No. 2, pp. 304-312.

Zhang, Preparation of Refined SiC Patterns from Imprinting of Partially Cross-linked Solid Polycarbosilane, J. Am. Ceram. Soc., 2012, vol. 95, No. 5, pp. 1530-1535.

International Search Report for PCT International Application No. PCT/US2013/052817 dated Nov. 12, 2013, 4 pages.

\* cited by examiner

ABRASIVE ELEMENT PRECURSOR WITH PRECISELY SHAPED FEATURES AND METHODS OF MAKING THEREOF

CROSS REFERENCE TO RELATED APPLICATIONS

This application is a national stage filing under 35 U.S.C. 371 of PCT/US2013/052817, filed Jul. 31, 2013, which claims priority to U.S. Provisional Application No. 61/678,661, filed Aug. 2, 2012, the disclosure of which is incorporated by reference in its/their entirety herein.

TECHNICAL FIELD

The present invention is related generally to abrasive articles. In particular, the present invention includes an abrasive element precursor comprising at least 99% carbide ceramic by weight.

BACKGROUND

The semiconductor and microchip industries rely on a number of chemical-mechanical planarization (CMP) processes during device manufacturing. These CMP processes are used to planarize the surface of a wafer in the fabrication of integrated circuits. Typically, they utilize an abrasive slurry and polishing pad. During the CMP process, materials are removed from the wafer and the polishing pad, and byproducts are formed. These can all accumulate on the polishing pad surface, glazing its surface and degrading its performance, decreasing its lifetime, and increasing wafer defectivity. To address these issues, pad conditioners are designed to regenerate the polishing pad performance through an abrading mechanism which removes the undesirable waste accumulations and recreates asperities on the polishing pad surface.

Most commercially available pad conditioners have industrial diamond abrasive bonded into a matrix. Typical matrix materials include nickel chromium, brazed metal, electroplating materials, and CVD diamond film. Due to the irregular size and shape distributions of diamonds as well as their random orientations, various proprietary processes have been devised to precisely sort, orient or pattern diamonds and to control their height. However, given the natural variation in diamond grit, it is not unusual that only 2-4% of the diamonds actually abrade the CMP pad ("working diamonds"). Controlling the distribution of cutting tips and edges of the abrasives is a manufacturing challenge, and contributes to variation in pad conditioner performance.

In addition, current matrix and bonding methods can also limit the size of diamonds that can be embedded. For example, small diamonds of less than around 45 microns can be difficult to bond without burying them within the matrix.

Acidic slurries for metal CMP can also pose challenges to traditional pad conditioners. The acidic slurries can chemically react with the metal bonding matrix, weakening the bond between the matrix and abrasive particles. This can result in detachment of the diamond particles from the conditioner surface, resulting in high wafer defect rates and potentially scratches on the wafer. Erosion of the metal matrix can also result in metal ion contamination of the wafer.

SUMMARY

In one embodiment, the present invention is an abrasive element precursor including a green body ceramic element having a first major surface, a second major surface, a plurality of inorganic particles, and a binder. At least the first major surface comprises a plurality of precisely shaped features. The plurality of inorganic particles is at least about 99% carbide ceramic by weight.

In another embodiment, the present invention is a method of making an abrasive element precursor. The method includes providing a mold having a plurality of precisely shaped cavities; providing a mixture comprising a plurality of inorganic particles and a binder, wherein the plurality of inorganic particles are at least about 99% carbide ceramic by weight; and forming a green body ceramic element having first and second major surfaces. At least the first major surface includes a plurality of precisely shaped features, and wherein the green body ceramic element includes a plurality of inorganic particles and a binder. The plurality of inorganic particles are at least about 99% carbide ceramic by weight, and wherein forming the green body ceramic element further includes filling a majority of the cavities with the mixture.

In yet another embodiment, the present invention is a method of forming an abrasive element. The method includes providing a mold having a plurality of precisely shaped cavities; providing a mixture comprising a plurality of inorganic particles and a binder, wherein the plurality of inorganic particles are at least about 99% carbide ceramic by weight; forming a green body ceramic element having first and second major surfaces, wherein at least the first major surface comprises a plurality of precisely shaped features, wherein the green body ceramic element comprises a plurality of inorganic particles and a binder, wherein the plurality of inorganic particles are at least about 99% carbide ceramic by weight and wherein forming the green body ceramic element further comprises filling a majority of the cavities with the mixture; removing the green body ceramic element from the mold; and heating the green body ceramic element to cause sintering of the inorganic particles.

BRIEF DESCRIPTION OF DRAWINGS

These figures are not drawn to scale and are intended merely for illustrative purposes.

DETAILED DESCRIPTION

The precisely shaped abrasive elements of the present invention are formed of about 99% carbide ceramic, have a porosity of less than about 5% and include a plurality of precisely shaped features. The plurality of precisely shaped features is monolithic rather than an abrasive composite. Unlike a composite which erodes to release embedded abrasive particles, the monolith functions without the loss of embedded abrasive particles, therefore reducing the chances of scratching. Abrasive articles incorporating the abrasive elements of the present invention have consistent and reproducible performance, precise alignment of the abrasive working tips against the workpiece surface, long lives, good feature integrity (including good replication, low erosion and fracture resistance), low metal ion contamination, reliability, consistent and cost effective manufacturing through design for manufacturing, and the ability to be tailored to various polishing pad configurations. In one embodiment, the abrasive article is a pad conditioner.

Abrasive Elements

The precisely structured abrasive elements of the present invention include a first major surface, a second major surface and a plurality of precisely shaped features on at least one of the major surfaces. The abrasive elements are formed of carbide and are about 99% carbide ceramic by weight. In one embodiment, the carbide ceramic is silicon carbide, boron carbide, zirconium carbide, titanium carbide, tungsten carbide or combinations thereof. In some embodiments, the 99% carbide ceramic by weight is substantially silicon carbide. In particular, the carbide ceramic is at least about 90% silicon carbide by weight. The abrasive elements are fabricated without the use of carbide formers and are substantially free of oxide sintering aides. In one embodiment, the abrasive elements include less than about 1% oxide sintering aides. The abrasive elements are also substantially free of silicon and in particular include less than about 1% elemental silicon.

It has been surprisingly found that a substantially carbide ceramic can be molded with excellent feature integrity. When these compositions are sintered, they yield robust and durable abrasive elements with less than about 5% porosity. In particular, the abrasive elements have a porosity of less than about 3% and more particularly less than about 1%. The abrasive elements also have a mean grain size of less than about 20 microns, particularly less than about 10 microns, more particularly less than about 5 microns and even more particularly less than about 3 microns. This low porosity and grain size are significant in achieving robust and durable replicated features, which in turn results in good life and low wear rates of the abrasive element.

In ceramic sintering, low porosity is often accomplished at the expense of grain size growth. It is surprising that these substantially carbide compositions can lend both low porosity and small grain size, despite high sintering temperatures. When this is combined with the added challenge of non-ideal compaction that can result from forming a structured green body, it is also surprising that these compositions can lend themselves to molding with high feature fidelity.

The abrasive elements include precisely shaped abrasive features, or projections in the abrasive elements that protrude toward a workpiece. The abrasive features can have any shape or shapes (polygonal or non-polygonal) and can have the same or varying heights. In addition, the abrasive features can have the same base size or varying base sizes. The abrasive features may be spaced in a regular or irregular array and may be made into patterns comprised of unit cells.

The abrasive elements include abrasive features having a length of between about 1 and about 2000 microns, particularly between about 5 and about 700 microns and more particularly between about 10 and about 300 microns. In one embodiment, the abrasive element has a feature density of from about 1 to about 1000 features/mm$^2$ and particularly between about 10 and about 300 features/mm$^2$.

In one embodiment, the abrasive elements include a peripheral zone, or an area on the periphery of the abrasive element in which there are no abrasive features.

The abrasive elements may be coated to achieve additional wear resistance and durability, reduce the coefficient of friction, protect from corrosion, and change surface properties. Useful coatings include, for example, chemical vapor deposited (CVD) or physical vapor deposited (PVD) diamond, doped diamond, silicon carbide, cubic boron nitride (CBN), fluorochemical coatings, hydrophobic or hydrophilic coatings, surface modifying coatings, anticorrosion coatings, diamond like carbon (DLC), diamond like glass (DLG), tungsten carbide, silicon nitride, titanium nitride, particle coatings, polycrystalline diamond, microcrystalline diamond, nanocrystalline diamond and the like. In one embodiment, the coating may also be a composite material, such as, for example, a composite of fine diamond particles and a vapor deposited diamond matrix. In one embodiment, these coatings are conformal, enabling the precise surface features to be seen under the coating surface. The coating can be deposited by any suitable method known in the art, including chemical or physical vapor deposition, spraying, dipping and roll coating.

In one embodiment, the abrasive elements may be coated with a non-oxide coating. When a CVD diamond coating is used, the use of the silicon carbide ceramic has the additional benefit in that there is a good match in the coefficient of thermal expansion between the silicon carbide and the CVD diamond film. Therefore, these diamond coated abrasives additionally have excellent diamond film adhesion and durability.

In one embodiment, the abrasive element is fabricated from a molded green body. In such cases, the abrasive element is considered a molded abrasive element. The precisely structured abrasive is ceramic pressed into a mold and sintered. The mold itself can be used in the fabrication of the precisely structured abrasive elements. Precisely structured abrasive elements have maximal feature height uniformity. The feature height uniformity refers to the uniformity of the height of selected features relative to the base of the feature. The non-uniformity is the average of the absolute values of the difference of heights of selected features from the average height of the selected features. The selected features are the set of features having maximum common design height $D_0$. A precisely shaped abrasive element of the invention has a non-uniformity of less than about 20% of the feature height. In one embodiment, the abrasive element has a non-uniformity of less than about 10% of the feature height, particularly less than about 5% of the feature height and more particularly less than about 2% of the feature height.

When the abrasive element is molded, it is a subset of the precisely structured abrasive element where the structure is conferred by a molding process. For example, the shape may be the inverse of the mold cavity such that the shape is retained after the abrasive element green body has been removed from the mold. Various ceramic shaping processes may be used, including but not limited to: injection molding, slip casting, die pressing, hot pressing, embossing, transfer molding, gel casting and the like. In one embodiment, the die pressing process is used at room temperature, followed by sintering. Typically, ceramic die pressing near room temperature is referred to as ceramic dry pressing. Ceramic dry pressing typically differs from ceramic injection molding in that it is done at lower temperature, a much smaller amount of binder is used, die pressing is used, and the materials suitable for use as binder are not necessarily limited to thermoplastics.

Abrasive Articles

The precisely engineered abrasive articles of the present invention generally include at least one abrasive element, a fastening element and a resilient element. In one embodiment, the precisely engineered abrasive articles include a plurality of abrasive elements. The fastening element is a material used to adhere one or more materials together. Examples of suitable fastening element can include, but are not limited to: a two part epoxy, pressure sensitive adhesives, structural adhesives, hot melt adhesives, B-stageable adhesives, mechanical fasteners and mechanical locking devices.

The resilient element functions to provide independent suspension of individual abrasive elements or global suspension of multiple structured abrasive elements. The resilient element is a material that is less rigid and more compressible than the precisely structured abrasive element and/or carrier. The resilient element elastically deforms under compression and can be locked into a compressed position through a fastening element, or allowed to elastically deform in use. The resilient element can be segmented, continuous, discontinuous or gimbaled. Examples of suitable resilient elements include, but are not limited to: mechanical spring-like devices, flexible washers, foams, polymers, or gels. The resilient element can also have a fastening character, such as foam with an adhesive backing. In one embodiment, the resilient element can also function as the fastening element.

Unlike diamond grit pad conditioners where diamond height is a variable, abrasive features of the abrasive elements can be aligned to a reference plane. The reference plane is the theoretical plane through the maxima of selected features of an abrasive element or an abrasive article. Feature maxima are also referred to as feature tips or tips. The selected features are the set of working features having a maximum common design height, $D_0$. For a contoured surface, the features that define the reference plane are the three features with the tallest height.

The alignment process is important to reproducibly create a defined bearing area or presentation to the workpiece or polishing pad. Unlike diamond grit conditioners which are aligned to the most planar surface which is the underlying carrier (i.e., not the diamond tips), the precisely structured abrasive elements are best aligned to using a planar surface (i.e., "alignment plate") in contact with the maxima of the features. The planar surface of the alignment plate preferably has a tolerance of at least about +/−2.5 microns per 4 inch in length (10.2 cm) or even lower, i.e. even more planar. A resilient element and a fastening element are used in this assembly process in order to precisely align the elements relative to each other on the carrier substrate.

The abrasive article may also include one or more cleaning elements, which may be continuous or discontinuous. The cleaning element has the function of providing for cleaning of a workpiece surface. The cleaning element may be comprised of a brush or other material designed to sweep away debris, or may be a channel or raised area providing for removal of slurry or swarf from a surface.

The abrasive elements may be aligned and mounted on a precisely planar carrier. Examples of suitable carrier materials include, but are not limited to: metals (e.g., stainless steel), ceramic, polymers (e.g., polycarbonate), cermet, silicon and composites. The abrasive element(s) and carrier may also have a circular or non-circular perimeter, be contoured, or possess the shape of a cup or donut, etc. In this case, the abrasive elements are aligned such that there is maximal feature tip coplanarity. The non-coplanarity is the average of the absolute values of the distance of a selected set of tips from the ideal reference plane through the set of tips. The non-coplanarity is expressed as a percentage relative to the height of the selected features, $D_o$.

The abrasive elements and articles of the present invention have a precisely engineered surface, resulting in reproducible and predictable surface topology, as measured by the low defect rate and number of features that engage the workpiece. When there are multiple feature heights present, the primary working features are the tallest features of essentially equal height. The secondary and tertiary working features are those of first and second offset in height from the primary working features such that the offset is smaller for the secondary feature than the tertiary feature. This definition extends to other feature heights.

The resulting abrasive elements and articles have precise feature replication, low defects and good uniformity and planarity of the primary features. A defect occurs when, for example, an unintentional depression, air-void, or bubble exists in the surface of the precisely-shaped abrasive feature, and typically varies in location and/or size from one precisely-shaped abrasive feature to the next. By looking at the overall shape and pattern of many precisely-shaped features in the abrasive article, the defects are readily discernable under a microscope when comparing the individual precisely shaped features in the array. In some embodiments, the precisely shaped abrasive element defect results in a missing apex of a precisely shaped abrasive feature. In one embodiment, the abrasive element or article has a percentage of defective features of less than about 30%, particularly less than about 15% and particularly less than about 2%.

The abrasive articles also have low or controlled warping or bowing of each abrasive element from processing or thermal mismatch with coated materials, resulting in good element planarity. "Element planarity" refers to the planarity of selected feature tips within a precisely structured abrasive element relative to a reference plane. The element planarity is determined in part by the mold design, fidelity of the molding tool, and uniformity of the molding and sintering processes (e.g., differential shrinkage and warpage), etc. For a single element, the planarity refers to the variability of the distance of a set of feature tips relative to a reference plane. The set of tips used to calculate planarity includes tips from all features having a common maximum design height, $D_0$. A reference plane is defined as the plane having the best linear regression fit of all of the selected feature tips of height $D_0$. The non-planarity is the average of the absolute value of the distance of the selected tips from the reference plane. The planarity can be measured by carbon paper imprint test or standard topology tools, including laser profilometry, confocal imaging, and confocal scanning microscopy, combined with image analysis software, e.g., MOUNTAINSMAP V5.0 image analysis software (Digital Surf, Besancon, France). Element topology can also be characterized by skew, kurtosis, etc. A precisely shaped abrasive element of the invention has a non-planarity of less than about 20% of the feature height. In one embodiment, the abrasive element has a non-planarity of less than about 10% of the feature height, particularly less than about 5% of the feature height and more particularly less than about 2% of the feature height.

The abrasive articles also have accurate alignment of the precisely shaped abrasive elements such that there is substantial coplanarity. For multiple elements, the coplanarity refers to the variability of the distance of a set of feature tips from a plurality of elements relative to a reference plane. This reference plane is defined as the plane having the best linear regression fit of all of the selected feature tips of maximum height $D_0$. The non-coplanarity is the average of the absolute values of the distance of selected tips from the reference plane. Non-coplanarity results when the separate abrasive elements are not aligned. Non-coplanarity can be seen through uneven pressure distribution, for example through a carbon imprint test. For multiple abrasive elements with even distribution on a carbon imprint test, the degree of coplanarity can be further quantified through standard topology tools, including laser profilometry, confocal imaging, and confocal scanning microscopy. Image software (e.g., MOUNTAINSMAP) can be used to combine multiple topographic maps into a composite topographic map for analysis. A collective group of features on all of the abrasive elements, having a common maximum design feature height of $D_0$, has a non-coplanarity of less than about 20% of the feature height. In one embodiment, the abrasive elements have a non-coplanarity of less than about 10% of the feature height, particularly less than about 5% of the feature height and more particularly less than about 2% of the feature height.

The abrasive elements of the present invention can be formed through machining, micromachining, microreplication, molding, extruding, injection molding, ceramic pressing, etc. such that precisely shaped structures are fabricated and are reproducible from part to part and within a part, reflecting the ability to replicate a design. In one embodiment, a ceramic die pressing process is used. In particular the ceramic die pressing process is ceramic dry pressing.

In one embodiment, an abrasive article including one or more abrasive elements is fabricated from a plurality of precisely shaped, engineered monoliths that are designed to have good feature integrity, are relatively non-erodible, and are fracture resistant. A monolith has a continuous structure and precisely shaped topology in which the abrasive features and the regions between the abrasive features of the abrasive element are continuous and consist of the primary abrasive material without an intervening matrix, such as exists in structured abrasive composites. The topology is predetermined and replicated from a material which can be formed from methods such as machining or micromachining, water jet cutting, injection molding, extrusion, microreplication or ceramic die pressing.

Green Body and Method

A molded ceramic green body can be sintered to achieve high density, rigidity, fracture toughness and good feature fidelity. The green body is the unsintered, compacted ceramic element, as would be normally referred to by those skilled in the art. The green body includes a first major surface, a second major surface and a plurality of precisely shaped features.

The green body includes a plurality of inorganic particles and a binder, where the plurality of inorganic particles is at least about 99% carbide ceramic by weight. In one embodiment, the inorganic particles are ceramic particles and can be silicon carbide, boron carbide, zirconium carbide, tungsten carbide or combinations thereof.

The binder of the green body can be a thermoplastic binder. Examples of suitable binders include, but are not limited to, thermoplastic polymers. In one embodiment, the binder is a thermoplastic binder with a $T_g$ of less than about 25° C. and particularly less than about 0° C. In one embodiment, the binder is a polyacrylate binder.

The green body also includes a carbon source. Suitable examples of the carbon source include, but are not limited to: phenolic resin, cellulose compounds, sugars, graphite, carbon black and combinations thereof. In one embodiment, the green body contains between about 0 to about 10% by weight of a carbon source and particularly between about 2 and about 7% by weight of a carbon source. The carbon compounds in the green body composition result in lower porosities after sintering. The green body can also include additional functional materials, such as a release agent or a lubricant. In one embodiment the green body contains between about 0 to 10% by weight of a lubricant.

A molded green body is produced by a ceramic shaping process, as discussed earlier. The green body may be sintered to form an abrasive element manufactured with substantial integrity. It is understood that the pre-sintered green body contains fugitive elements, such as carbon, that are not substantially present in the final sintered article. (Therefore, the carbide phases are 99% in the final sintered article, but of a lower composition in the green body.)

The green body is an abrasive element precursor and is made by first mixing a plurality of inorganic particles, a binder and a carbon source to form a mixture. In one embodiment, the agglomerates of the mixture are formed by a spray drying process.

In one embodiment, the green body is formed by a die pressing operation, such as ceramic dry pressing. The spray dried agglomerates of the mixture are filled into a die cavity. The agglomerates may optionally be sieved to provide agglomerates of a particular size. For example, the agglomerates may be sieved to provide agglomerates having a size of less than about 45 microns.

A mold having a plurality of precisely shaped cavities is placed in the die cavity such that a majority of the precisely shaped cavities of the mold are filled with the mixture. The mold may be formed of metal, ceramic, cermet, composite or a polymeric material. In one embodiment, the mold is a polymeric material such as polypropylene. In another embodiment, the mold is nickel. Pressure is then applied to the mixture to compact the mixture into the precisely shaped cavities to form a green body ceramic element having first and second major surfaces. The pressure may be applied at ambient temperature or at an elevated temperature. More than one pressing step may also be used.

The mold, or production tool, has a predetermined array of at least one specified shape on the surface thereof, which is the inverse of the predetermined array and specified shape(s) of the precisely shaped features of the abrasive elements. As mentioned above, the mold can be prepared from metal, e.g., nickel, although plastic tools can also be used. A mold made of metal can be fabricated by engraving, micromachining or other mechanical means, such as diamond turning or by electroforming. The preferred method is electroforming.

In addition to the above technique, a mold can be formed by preparing a positive master, which has a predetermined array and specified shapes of the precisely shaped features of the abrasive elements. The mold is then made having a surface topography being the inverse of the positive master.

A positive master may be made by direct machining techniques such as diamond turning, disclosed in U.S. Pat. No. 5,152,917 (Pieper, et al.) and U.S. Pat. No. 6,076,248 (Hoopman, et al.), the disclosures of which are herein incorporated by reference. These techniques are further described in U.S. Pat. No. 6,021,559 (Smith), the disclosure of which is herein incorporated by reference.

A mold including, for example, a thermoplastic, can be made by replication off the metal master tool. A thermoplastic sheet material can be heated, optionally along with the metal master, such that the thermoplastic material is embossed with the surface pattern presented by the metal master by pressing the two surfaces together. The thermoplastic can also be extruded or cast onto to the metal master and then pressed. Other suitable methods of production tooling and metal masters are discussed in U.S. Pat. No. 5,435,816 (Spurgeon et al.), which is herein incorporated by reference.

To form a precisely engineered abrasive element, the green body ceramic element is removed from the mold and heated to cause sintering of the inorganic particles. In one embodiment, the green body ceramic element is heated during a binder and carbon source pyrolization step in an oxygen poor atmosphere in a temperature range of between about 300 and about 900° C. In one embodiment, the green body ceramic element is sintered in an oxygen-poor atmosphere at between about 1900 and about 2300° C. to form the abrasive element.

After cleaning, the abrasive element is optionally coated.

Assembly

The precisely engineered abrasive article is assembled by first placing the first major surfaces of a first and a second abrasive element in contact with an alignment plate. A first major surface of a resilient element is then contacted with the second major surfaces of the abrasive elements. The second major surface of the resilient element is then affixed to a carrier through the fastening element. The assembly is then bonded together under pressure. When assembled, the plane defined by the working tips is substantially planar with respect to the backplane of the carrier. In one embodiment, the abrasive article is a single sided pad conditioner in which the precisely shaped features are located on one surface. However, the pad conditioner can also be assembled such that it is double sided, with both sides presenting precisely structured features.

Uses

Pad conditioners having the precisely structured abrasive elements of the invention may be used in conventional Chemical Mechanical Planarization (CMP) processes. Various materials may be polished or planarized in such conventional CMP processes, including, but not limited to: copper, copper alloys, aluminum, tantalum, tantalum nitride, tungsten, titanium, titanium nitride, nickel, nickel-iron alloys, nickel-silicide, germanium, silicon, silicon nitride, silicon carbide, silicon-dioxide, oxides of silicon, hafnium oxide, materials having a low dielectric constant, and combinations thereof. The pad conditioners may be configured to mount onto conventional CMP tools in such CMP processes and run under conventional operating conditions. In one embodiment, the CMP process is run at a range of rotational speeds between about 20 RPM and about 150 RPM, at a range of applied load of between about 1 lb and about 90 lbs, and sweeping back and forth across the pad at a rate of between about 1 and about 25 sweeps per minute, utilizing conventional sweep profiles, such as sinusoidal sweeps or linear sweeps.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following example are on a weight basis.

Test Methods

Feature Defect Test Method

Abrasive articles having precisely shaped abrasive features were examined under a stereomicroscope at 63× total magnification (Model SZ60 from Olympus America Inc., Center Valley, Pa.). A defect was defined as a feature that was missing, possessed an unintentional depression(s), air-void, bubble or a feature that possessed a tip that appeared craterlike or truncated, rather than sharply and fully formed. The percent of defective features was defined as the number of features with primary defects on an abrasive element divided by the total number of features on an abrasive element, multiplied by 100.

Element Planarity Test Method

The non-planarity of an individual abrasive element with precisely shaped features was measured using laser profilometry and a Leica DCM 3D confocal microscope, combined with MOUNTAINSMAP V5.0 image analysis software (Digital Surf, Besancon, France). A Micro-Epsilon OptoNCDT1700 laser profilometer (Raleigh, N.C.) was mounted to an X-Y stage provided by B&H Machine Company, Inc. (Roberts, Wis.). The profilometer scan rate and increment were adjusted to provide sufficient resolution to accurately locate the feature tips, thus were dependent on the type, size and patterning of the precisely shaped features. For an abrasive element, a group of features, all having the same maximum design feature height of $D_0$, was selected, and their height measured relative to a base plane. A reference plane is defined as the plane having the best linear regression fit of all of the selected feature tips of height $D_0$. The non-planarity is the average of the absolute value of the distances of the selected tips from the reference plane. The non-planarity is expressed as a percentage relative to the height of the selected features, $D_0$.

Abrasive Article Coplanarity Test Method I

The coplanarity of an abrasive article having multiple abrasive elements was measured by a Carbon Paper Imprint test (CPI test). The article was placed a planar granite surface such that the precisely shaped features were facing upwards, away from the granite surface. Carbon paper was then placed against the features with carbon side facing upwards. A white sheet of photo quality paper was placed on top of the carbon paper such that the carbon was in direct contact with the photo paper so as to create an image on the photo paper. A planar plate was placed on top of the photopaper/carbon paper/abrasive article stack. A load 120 lb (54.4 kg) was applied to the stack for 30 seconds. The load was removed and the photo paper was scanned with an image scanner to record the imprinted image.

A coplanar abrasive article results in images where the separate elements are of equal size and color intensity, as quantified visually and through image analysis. When the elements of an abrasive article are significantly non-coplanar, images of the individual elements may be missing, asymmetric or show significant lighter intensity areas.

Abrasive Article Coplanarity Test Method II

The coplanarity can be measured by standard topology tools, including laser profilometry, confocal imaging, and confocal scanning microscope, combined with image analysis software (e.g., MOUNTAINSMAP). Element topology can also be characterized by skew, kurtosis, etc.

For multiple elements, the coplanarity refers to the variability of the position of a set of feature tips from a plurality of elements relative to a reference plane. A reference plane is defined as the plane having the best linear regression fit of all of the selected features of height $D_0$. The set of feature tips used to calculate coplanarity includes tips from all features having common, maximum design height $D_0$. The non-coplanarity is calculated using the average of the absolute values of the distance of selected tips from the reference plane. The non-coplanarity is expressed as a percentage relative to the height of the selected features, $D_0$.

Bulk Density and Porosity Test Methods

The bulk density and apparent porosity of the abrasive elements with precisely shaped features were measured according to ASTM test method C373. The total porosity was also calculated based the bulk density and an assumption of a theoretical density for an abrasive element of 3.20 g/cm$^3$. The calculated porosity is the following: [(theoretical density−bulk density)/theoretical density]*100.

Mean Grain Size Test Method

The mean surface grain size of carbide grains of the abrasive elements with precisely shaped features was determined by examining the surface of the elements by optical microscopy or scanning electron microscopy. For optical microscopy, a Nikon model ME600 (Nikon Corporation, Tokyo, Japan) was used at 100× magnification. For scanning electron microscopy a Hitachi High-Tech model TM3000 (Hitachi Corporation, Tokyo, Japan) was used at 5,000× magnification, 15 keV acceleration voltage and 4-5 mm working distance. The line intercept method was used. First, 5 straight lines were drawn horizontally across the image (approximately equally spaced). Next, the number of grains intercepted by the lines was counted, excluding the first and last grains which were at the edge of the image. The length of the line (scaled to the image) was then divided by the average number of intercepted grains and multiplied by a factor of 1.56 to determine the average grain size (Average grain size=1.56*length of line/average number of grains intercepted).

Copper Wafer Removal Rate and Non-Uniformity Test Method

Removal rate was calculated by determining the change in thickness of the copper layer being polished. This change in thickness was divided by the wafer polishing time to obtain the removal rate for the copper layer being polished. Thickness measurements for 300 mm diameter wafers were taken with a ResMap 168, 4 point probe Rs Mapping Tool available from Credence Design Engineering, Inc., Cupertino, Calif. Eighty-one point diameter scans with 5 mm edge exclusion were employed. Wafer non-uniformity (% NU) was calculated by the standard deviation of 49 wafer thickness measurements across the wafer divided by the mean wafer thickness value.

Oxide Wafer Removal Rate and Non-Uniformity Test Method

Removal rate was calculated by determining the change in thickness of the oxide layer being polished. This change in thickness was divided by the wafer polishing time to obtain the removal rate for the oxide layer being polished. Thickness measurements for 300 mm oxide blanket rate wafers were made using a NovaScan 3060 ellipsometer which is integrated with the REFLEXION polisher and was supplied by Applied Materials, Inc. Santa Clara, Calif. Oxide wafers were measured with a 25 point diameter scan with 3 mm edge exclusion. Wafer non-uniformity (% NU) was calculated by the standard deviation of 49 wafer thickness measurements across the wafer divided by the mean wafer thickness value.

CMP Pad Wear Rate and Pad Surface Roughness Test Methods

Measurements were conducted using the laser profilometry and software analysis tools described previously in the Element Planarity Test Method. A radial strip of dimension 1 inch (2.5 cm) by 16 inch (40.6 cm) pad strip was cut out of the 30.5 inch polishing pad, after processing on the 300 mm REFLEXION tool. Two dimensional X-Y laser profile scans were conducted over a 1 cm$^2$ region at locations 3 inch (7.6 cm), 8 inch (20.3 cm) and 13 inch (33.0 cm) distance from the pad center. MOUNTAINSMAP software was used to obtain the pad wear rate and surface roughness (Sa) by analyzing the change in the pad groove depth, as a function of polishing time, at these different pad positions and also by analyzing the pad surface texture, using 2D and 3D digital images. Pad wear rate was calculated as the average pad wear at 3, 8, and 13 inches from the pad center divided by the total finishing time.

Polishing Test Method 1

Polishing was conducted using a CMP polisher available under the trade designation REFLEXION polisher from Applied Materials, Inc., of Santa Clara, Calif. An IC1010 pad and CSL9044C slurry were used for polishing. A sample of 30% (wt basis) hydrogen peroxide, ($H_2O_2$) was added to the slurry to obtain a $H_2O_2$ concentration in the slurry of 3% (wt basis), prior to starting the test. An abrasive article, having a carrier suitable for mounting onto the pad conditioner arm of the tool, was mounted thereon. The pad was conditioned continuously throughout the test with slurry being run on the pad continuously throughout the test. At appropriate time intervals, four 300 mm copper "dummy" wafers would be run, followed by two, 300 mm electroplated copper wafers, 20 kÅ Cu thickness, to monitor copper removal rate, one run at the low wafer downforce head conditions and the other at the high wafer downforce head conditions. Head pressure was either high downforce (designated as 3.0 psi) or low downforce (designated as 1.4 psi). The specific set pressures of each zone in the head are described below. The process conditions were as follows:

Head speed: 107 rpm
Platen speed: 113 rpm
Head pressure:
A) For high downforce tests (3.0 psi): Retaining Ring=8.7 psi, Zone1=7.3 psi, Zone2=3.1 psi, Zone3=3.1 psi, Zone4=2.9 psi, Zone 5=3.0 psi
B) For low downforce tests (1.4 psi): Retaining Ring 3.8 psi, Zone1=3.3 psi, Zone2=1.6 psi, Zone3=1.4 psi, Zone4=1.3 psi, Zone5=1.3 psi
Slurry flow rate: 300 ml/min
Polishing time for the dummy wafers: 30 sec
Polishing time for rate wafers: 60 sec
Pad conditioner down force: 5 lb
Pad conditioner speed: 87 rpm
Pad conditioner sweep rate: 10 sweeps/min
Pad conditioner sweep type: Sinusoidal Polishing Test Method 2

Polishing was conducted using a CMP polisher available under the trade designation REFLEXION polisher from Applied Materials, Inc. A WSP pad and 7106 slurry were used for polishing. A sample of 30% (wt basis) $H_2O_2$ was added to the slurry to obtain a $H_2O_2$ concentration in the slurry of 3% (wt basis), prior to starting the test. An abrasive article, having a carrier suitable for mounting onto the pad conditioner arm of the tool, was mounted thereon. The pad was conditioned continuously throughout the test with slurry being run on the pad continuously throughout the test. At appropriate time intervals, four 300 mm Cu "dummy" wafers would be run, followed by two, 300 mm electroplated Cu wafers, 20 kÅ Cu thickness, to monitor Cu removal rate, one run at the low wafer downforce head conditions and the other at the high wafer downforce head conditions. Head pressure was either high downforce (designated as 3.0 psi) or low downforce (designated as 1.4 psi). The specific set pressures of each zone in the head are described below. The process conditions were as follows:

Head speed: 49 rpm
Platen speed: 53 rpm
Head pressure:
A) For high downforce tests (3.0 psi): Retaining Ring=8.7 psi, Zone1=7.3 psi, Zone2=3.1 psi, Zone3=3.1 psi, Zone4=2.9 psi, Zone 5=3.0 psi
B) For low downforce tests (1.4 psi): Retaining Ring 3.8 psi, Zone1=3.3 psi, Zone2=1.6 psi, Zone3=1.4 psi, Zone4=1.3 psi, Zone5=1.3 psi
Slurry flow rate (when used): 300 ml/min
Polishing time for the dummy wafers: 30 sec
Polishing time for rate wafers: 60 sec
Pad conditioner down force: 5 lb
Pad conditioner speed: 119 rpm
Pad conditioner sweep rate: 10 sweeps/min
Pad conditioner sweep type: Sinusoidal Polishing Test Method 3

Polishing was conducted using a CMP polisher available under the trade designation REFLEXION polisher from Applied Materials, Inc. A VP5000 pad and D6720 slurry were used for polishing. The D6720 was diluted with DI water at a ratio of 3 parts water to 1 part slurry. An abrasive article, having a carrier suitable for mounting onto the pad conditioner arm of the tool, was mounted thereon. The pad was conditioned continuously throughout the test with slurry being run on the pad continuously throughout the test. At appropriate time intervals, four 300 mm thermal silicon oxide "dummy" wafers would be run, followed by a 300 mm, thermal silicon oxide wafer, 17 kÅ silicon oxide thickness, to monitor oxide removal rate. The process conditions were as follows:

Head speed: 87 rpm
Platen speed: 93 rpm
Head pressure: Retaining Ring=12 psi, Zone1=6 psi, Zone2=6 psi, Zone3=6 psi, Z4=6 psi, Zone5=6 psi.
Slurry flow rate): 300 ml/min
Polishing time for the dummy wafers: 60 sec
Polishing time for rate wafer: 60 sec
Pad conditioner down force: 6 lb
Pad conditioner speed: 87 rpm
Pad conditioner sweep rate: 10 sweeps/min
Pad conditioner sweep type: Sinusoidal Materials

| Abbreviation or Trade Name | Description |
|---|---|
| SCP1 | A silicon carbide powder with an average particle size of 0.6 micron, available under the trade designation "HSC 490N" from Superior Graphite Co., Chicago, Illinois. |
| BCP1 | A boron carbide powder with an average particle size of 0.5-0.8 micron, available under the trade designation "HSC B4C" from Superior Graphite Co. |
| BCP2 | A boron carbide powder, used for a sintering powder bed, with an average particle size of 2 micron, available under the trade designation "CERAC/PURE B-1102" from Materion Advanced Chemicals, Milwaukee, Wisconsin. |
| Graph1 | A graphite powder, used for a sintering powder bed, available under the trade designation "THERMOPURE GRADE 5900" from Superior Graphite Co. |
| Dura B | A 55% solids (aqueous emulsion) ceramic binder available under the trade designation "DURAMAX B-1000" from the DOW Chemical Company, Midland Michigan. |
| PhRes | A one-part phenolic resin available under the trade designation "DUREZ 07347A" from Sumitomo Bakelite North America, Inc., Novi, Michigan. |
| Glucose | A glucose powder, available under the trade designation "BIOXTRA D-(+)-GLUCOSE," from Sigma-Aldrich, St. Louis, Missouri. |
| PDMS | A silicone oil available under the trade designation "PST-850" from PolySi Technologies, Inc., Sanford, North Carolina. |
| PS80 | A polysorbate 80 fluid available under the trade designation "Polysorbate 80" from BDH, a unit of VWR International, LLC, Radnor, Pennsylvania. |
| IC1010 | A relatively hard CMP polishing pad available under the trade designation "IC1010" from DOW Chemical Company. |
| WSP | A relatively soft CMP polishing pad available under the trade designation "WSP" from JSR Corporation, Tokyo, Japan. |
| VP5000 | A CMP polishing pad available under the trade designation "VISIONPAD 5000" from DOW Chemical Company. |
| CSL9044C | A copper CMP slurry available under the trade designation "CSL9044C" from Planar Solutions, LLC, Mesa, Arizona. |
| 7106 | A copper CMP slurry available under the trade designation "PLANERLITE-7006" from Fujimi Incorporated, Kiyosu, Japan. |
| D6720 | An oxide CMP slurry available under the trade designation "IDIEL D6720 SLURRY" from Cabot Microelectronics, Aurora, Illinois. |

Example 1

Preparation of a Production Tool with a Plurality of Cavities

Figure 1A:
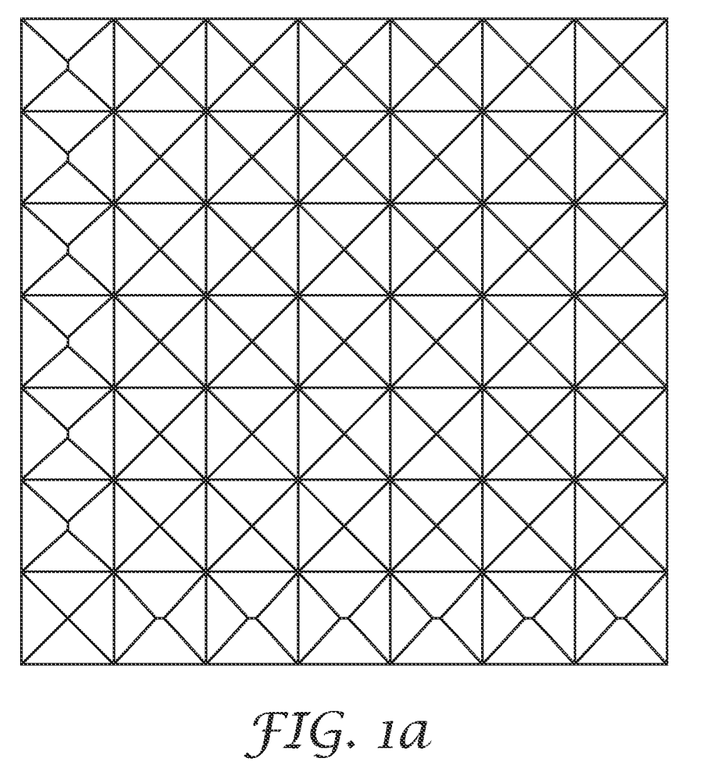
FIG. 1a is a top view of a positive master having pyramid precisely shaped features arranged in a grid pattern used in some of the Examples.
Figure 1B:
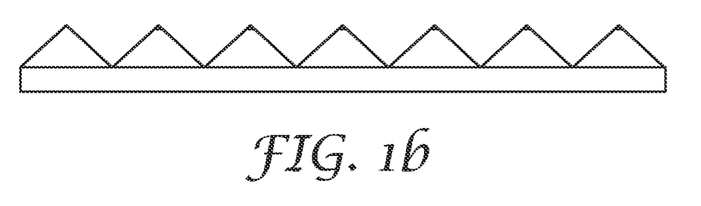
FIG. 1b is a cross-sectional view of the positive master of FIG. 1a having pyramid precisely shaped features arranged in a grid pattern.

A positive master was prepared by diamond turning of a first metal, followed by two iterations of electroforming a second metal, producing the positive master. The dimensions of the precisely shaped features of the positive master were as follows. The precisely shaped features consisted of four sided, sharp tipped pyramids, 73.5% of the pyramids having a square base with a base length 390 microns and a height of 195 microns (primary feature), 2% of the pyramids having a square base with a base length 366 microns and a height of 183 microns and 25.5% of the pyramids having a rectangular base with a length of 390 microns, a width of 366 microns and a height 183 (secondary features). The pyramids were arranged in a grid pattern, per FIGS. 1a and b; all spacing between pyramids was 5 microns at the base.

Polypropylene production tools were produced by compression molding from the positive master using a sheet of 20 mil (0.51 mm) thick polypropylene available from Commercial Plastics and Supply Corp., West Palm Beach, Fla. Compression molding was conducted using a model V75H-24-CLX WABASH HYDRAULIC PRESS, from Wabash MPI, Wabash, Ind., with platens pre-heated to 165° C. at a load of 5,000 lb (2,268 kg) for 3 minutes. The load was then increased to 40,000 lb (18,140 kg) for 10 minutes. The heaters were then switched off and cooling water flowed through the platens until they reached about 70° C. (about 15 minutes). The load was then released and the molded polypropylene tool was removed.

Preparation of a Ceramic Slurry

A ceramic slurry was prepared by placing the following components into 1 L high density polyethylene jar: 458.7 g distilled water, 300.0 g SCP1, 1.5 g BCP1, and 21.9 g PhRes. Spherical, silicon carbide milling media, 0.25 inch diameter (6.35 mm) was added, and the slurry was milled on a ball mill for 15 hours at 100 rpm. After milling, 60.9 g of Dura B was added to the jar and mixed in by stirring. The slurry was spray dried using a spray dryer available under the trade designation "Mini Spray Dryer B-191" from Buchi, New Castle, Del., producing a ceramic-binder powder composed of 85.37 wt % silicon carbide, 0.43 wt % boron carbide, 9.53 wt % polyacrylate binder, and 4.67 wt % phenolic resin with an average particle size of 32-45 microns, as measured by conventional test sieving. The ceramic-binder powder may be used in the preparation of a green body ceramic element having precisely shaped features.

Preparation of a Green Body Ceramic Element with Precisely Shaped Features

A circular, steel die cavity, 16.65 mm diameter, having upper and lower press rods, was used to mold a green body ceramic element having precisely shaped features. The polypropylene production tool, having precisely designed cavities representing the feature type (shape), size and pattern of the desired precisely shaped features of the green body ceramic element, was placed in the die cavity on the lower press rod, with the cavities facing the upper press rod. The production tool surface, including the cavities, was then lubricated with 4 drops of a 25/75 wt/wt PDMS/hexane solution, to facilitate replication and green body release. For other examples, this step was not used if PDMS was included in the ceramic slurry composition (see Table 1). After the hexane was allowed to evaporate, the die was charged with 1 g of the ceramic-binder powder. A 10,000 lb (4,536 kg) load was applied to the upper push rod for 30 sec, pressing the ceramic-binder powder into the tool cavities. The load was removed and an additional 1 g of ceramic-binder powder was added to the die cavity. A 20,000 lb (9,072 kg) load was applied to the upper push rod for 30 seconds. The load was removed and the tool with pressed ceramic-binder powder was removed from the die cavity.

The green body ceramic element with precisely shaped features was then removed from the tool. The features were the inverse of the tool cavities. The overall diameter and thickness of the green body reflected the diameter of the die cavity and the amount of ceramic-binder powder, respectively. After removal from the die cavity, the ceramic element had a diameter of about 16.7 mm and a thickness of about 4.2 mm. Five, green body ceramic elements were made by this technique. The green body ceramic element with precisely shaped features may be used as an abrasive element precursor in the preparation of an abrasive element having precisely shaped features.

Preparation of an Abrasive Element with Precisely Shaped Features

The previously prepared abrasive element precursors, i.e. green body ceramic elements with precisely shaped features, were placed in a Lindbergh Model 51442-S retort oven, available from SPX Thermal Product Solutions, a division of SPX Corporation, Rochester, N.Y., at room temperature. In order to degrade and volatilize the binder component of the green body ceramic elements, the green body ceramic elements were annealed under a nitrogen atmosphere, as follows: the oven temperature was increased at a linear rate to 600° C. over a 4 hour time period, followed by a 30 min isothermal hold at 600° C. The oven was then cooled to room temperature. The sharp edges, i.e., flashing, were removed from the annealed green body ceramic elements by abrading their outer circumference with 220-grit silicon carbide sandpaper.

The annealed, green body ceramic elements were loaded into a graphite crucible for sintering. The elements were placed in a bed of a powder mixture, i.e. a sintering powder bed, consisting of 97 wt % Graph1 and 3 wt % BCP2. The green bodies were then sintered, under a helium atmosphere, by heating from room temperature to 2,150° C. over 5 hours, followed by a 30 min isothermal hold at 2,150° C., using an Astro furnace HTG-7010 available from Thermal Technology LLC, Santa Rosa, Calif.

The sintered, green body ceramic elements may be used as abrasive elements with precisely shaped features. Following the sintering process, the abrasive elements were cleaned.

Using the Feature Defect Test Method, it was determined that the abrasive elements had less than 5% of defective features.

Examples 2-10 and Comparative Example 11 (CE11)

Examples 2-8 and CE11 were prepared similarly to that of Example 1, except the ceramic slurry compositions and the sintering powder bed used were varied according to Table 1. A graphite crucible was used for all sintering procedures, except for that of Example 10, which employed a silicon carbide crucible.

Examples 9 and 10 were prepared similarly to Example 1, except that the molding of the precisely shaped features was conducted in a one step process, using a metal production tool, instead of the polypropylene production tool. The metal production tool was fabricated from the positive master by an electroforming process. Two grams of ceramic-binder powder were added to the steel die cavity, and the production tool, with precisely shaped features facing downward, was added to the die cavity. A 15,000 lb (6,804 kg) load was applied to the upper push rod for 15 sec, pressing the ceramic-binder powder into the tool cavities. The load was removed and the tool with pressed ceramic-binder powder was removed from the die cavity. The sintering powder bed for Example 9 was a 97/3 (wt/wt) mixture of Graph1/BCP1.

gen gas was used as precursors for the CVD diamond coating process. During deposition, the reactor pressure was kept between 6 Torr (800 Pa) and 50 Torr (6,670 Pa) and the filament temperature was between 1,900 and 2300° C., as measured by an optical pyrometer. CVD diamond growth rate was 0.6 µm/hr.

TABLE 1

Ceramic Slurry Composition and Sintering Conditions

| Ex. | Distilled Water | SCP1 | BCP1 | Dura B | PhRes | Glucose | PDMS | PS80 | Sintering Powder Bed Graph1/BCP2 (wt/wt) |
|---|---|---|---|---|---|---|---|---|---|
| 1 | 458.7 | 300.0 | 1.5 | 60.9 | 21.9 | — | — | — | 97/3 |
| 2 | 468.0 | 300.0 | 1.5 | 60.7 | — | 19.1 | — | — | 97/3 |
| 3 | 458.1 | 300.0 | 1.5 | 609 | 21.9 | — | 26.0 | 4.0 | 97/3 |
| 4 | 233.8 | 149.9 | 0.4 | 30.4 | — | 9.6 | — | — | 97/3 |
| 5 | 233.8 | 149.9 | 0.4 | 30.4 | — | 9.6 | — | — | No Bed |
| 6 | 468.0 | 300.0 | 1.5 | 60.7 | — | 19.1 | — | — | 100/0 |
| 7 | 486.4 | 300.0 | 1.1 | 30.4 | 22.3 | — | — | — | 97/3 |
| 8 | 465.6 | 300.0 | 1.1 | 60.8 | 12.3 | — | — | — | 97/3 |
| 9 | 458.7 | 300.0 | 1.5 | 60.9 | 21.9 | — | 30.6 | 0.6 | NA |
| 10 | 458.7 | 300.0 | 1.5 | 60.9 | 21.9 | — | 30.6 | 0.6 | No Bed |
| CE 11 | 403.0 | 269.9 | 5.5 | 49.5 | — | — | — | — | 97/3 |

The physical properties of the abrasive elements including mean grain size, porosity, bulk density and calculated porosity are shown in Table 2.

TABLE 2

Physical Properties of Abrasive Elements.

| Example | Mean Grain size (microns) | Apparent Porosity from ASTM C373 (%) | Bulk Density ASTM C373 (g/cm$^3$) | Calculated Total Porosity (%) |
|---|---|---|---|---|
| 1 | <2-3 (optical microscopy) | 0.04 | 3.17 | 0.94 |
| 2 | <2-3 (optical microscopy) | 0.01 | 3.13 | 2.19 |
| 3 | — | 0.10 | 3.16 | 1.24 |
| 4 | — | 0.05 | 3.13 | 2.19 |
| 5 | — | 0.11 | 3.12 | 2.50 |
| 6 | — | 0.49 | 3.09 | 3.44 |
| 7 | — | 0.01 | 3.16 | 1.25 |
| 8 | — | 0.03 | 3.14 | 1.88 |
| 9 | — | 0.05 | 3.14 | 1.73 |
| 10 | 3.8 (SEM) | 0.04 | 3.15 | 1.71 |
| CE11 | — | 24.5 | 2.36 | 26.2 |

Preparation of Abrasive Elements with CVD Diamond Coating

The abrasive elements with precisely shaped features, from Examples 1-10, were first degreased by ultrasonic cleaning in methyl ethyl ketone, dried and then diamond seeded by immersing in an ultrasonic bath containing a nano-diamond solution, available under the trade designation 87501-01, from sp3 Diamond Technologies, Santa Clara, Calif. Once removed from the diamond solutions, the elements were dried using a low pressure, pure nitrogen gas flow. The elements were then loaded into a hot filament CVD reactor model HF-CVD655 available from sp3 Diamond Technologies. A mixture of 2.7% methane in hydro- Coating adhesion was evaluated by immersing the coated elements in liquid nitrogen followed by a DI water rinse. This procedure was repeated 5 times. All examples passed this test.

Example 12

An abrasive article comprising five abrasive elements from Example 1 with precisely shaped features was assembled. The assembly process was developed such that the tallest, precisely shaped features on each element, all having the same design feature height, would become planar.

A planar granite surface was used as an alignment plate. The segments were placed onto the alignment plate such that the major surfaces having precisely shaped features were in direct contact with the alignment plate (facing down) with their second flat, major surfaces facing upwards. The abrasive elements were arranged in a circular pattern, such that their center points were positioned along the circumference of a circle with a radius of about 1.75 inch (44.5 mm) and spaced apart equally at about 72° around the circumference, FIG. 2. A resilient element, a flexible washer, part no. 9714K22, 302 stainless steel wave spring washer available from McMaster-Carr, Atlanta, Ga., was placed onto the flat surface of each abrasive element. A fastening element was then applied to the washers and exposed surface of the abrasive elements in the center-hole region of the washers. The fastening element was an epoxy adhesive available under the trade designation 3M SCOTCH-WELD EPOXY ADHESIVE DP420 from 3M Company, St. Paul, Minn. A circular, stainless steel carrier, having a diameter of 4.25 inch (108 mm) and a thickness of 0.22 inch (5.64 mm) was then placed face down on top of the fastening element (the back side of the carrier is machined, such that, it may be attached to the carrier arm of a REFLEXION polisher). A 10 lb (4.54 kg) load was applied uniformly across the carrier's exposed surface and the adhesive was allowed to cure for about 4 hours at room temperature.

Comparative Example 13 (CE13)

CE13 was prepared similarly to Example 12, except that resilient elements were not used in the fabrication process.

Figure 3A:
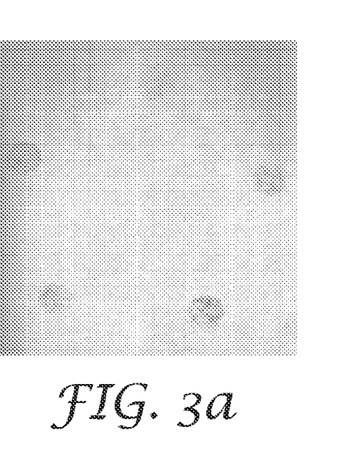
FIGS. 3a and 3b shows the global coplanarity of Example 12 and Comparative Example 13.
Figure 3B:
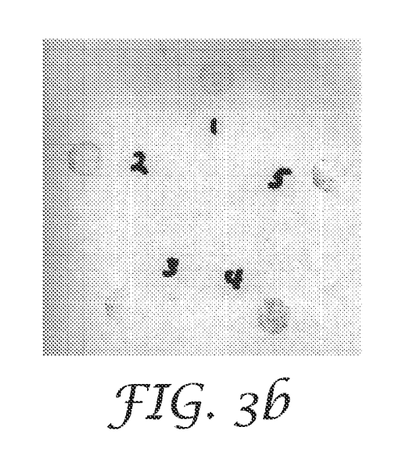

The global coplanarity of the abrasive elements of Example 12 and CE13 was measured using the Abrasive Article Coplanarity Test Method I. FIG. 3 shows the results. Based on the more uniform imprints of the abrasive elements, Example 12, which included the resilient elements, shows improved planarity, over CE13, which did not employ the resilient elements.

Examples 14-16

Figure 4A:
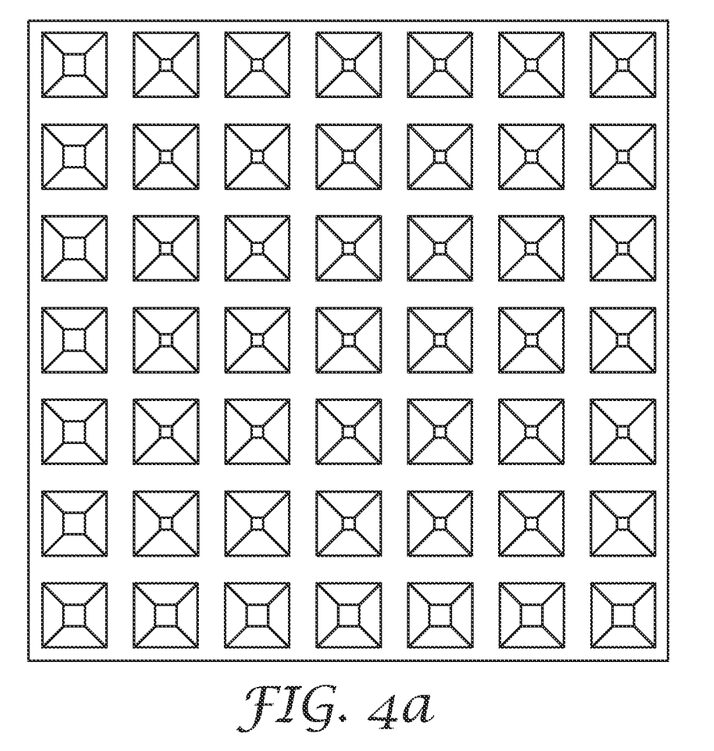
FIG. 4a is a top view of a positive master having pyramid precisely shaped features arranged in a grid pattern used in Example 15.
Figure 4B:
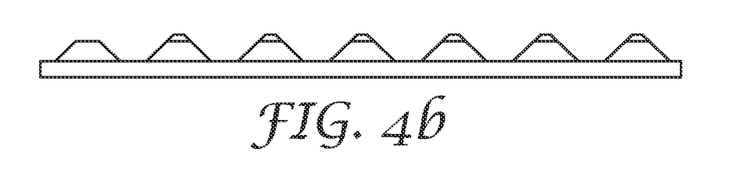
FIG. 4b is a cross-sectional view of the positive master of FIG. 4a having pyramid precisely shaped features arranged in a grid pattern.
Figure 5A:
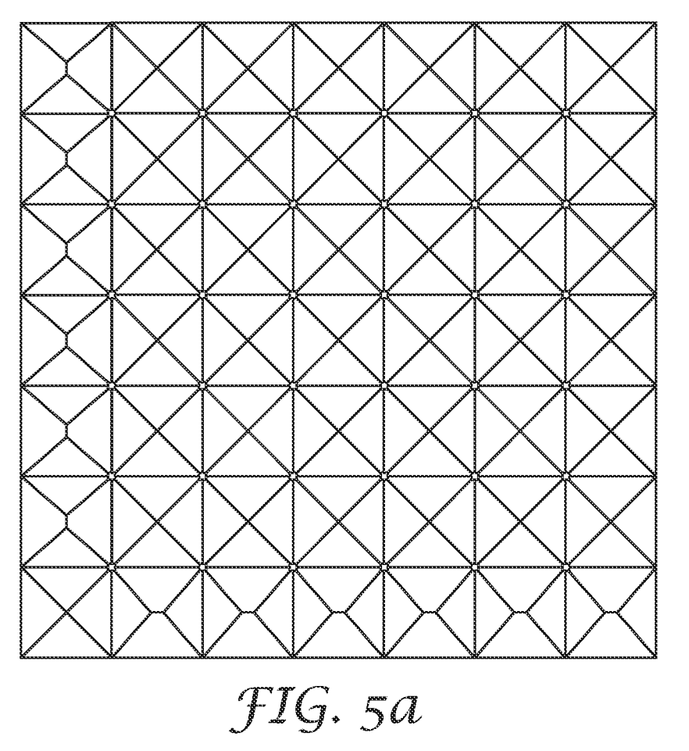
FIG. 5a is a top view of a positive master having pyramid precisely shaped features arranged in a grid pattern used in Example 16.
Figure 5B:
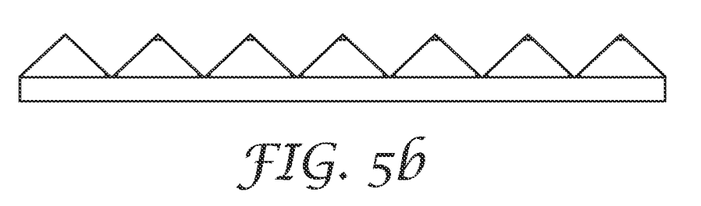
FIG. 5b is a cross-sectional view of the positive master of FIG. 5a having pyramid precisely shaped features arranged in a grid pattern.

The abrasive elements used in Examples 14-16 were prepared as described in Example 1. Each abrasive element had precisely shaped features having at least two different heights, a primary feature height, which was the higher of the two features, and a secondary feature height, as summarized in Table 3. The offset height is the height difference between the primary and secondary feature. The precisely shaped features of Example 14 were the same as that described for Example 1. The precisely shaped features of Example 15 consisted of four sided, truncated pyramids, 73.5% of the pyramids having a square base with a base length 146 microns and a height of 61 microns, with a square top 24 microns on a side (primary feature) and 26.5% of the pyramids having a square base with a base length 146 microns and a height of 49 microns, with a square top 48 microns on a side (secondary feature). The pyramids were arranged in a grid pattern, per FIGS. 4a and b; all spacing between pyramids was 58.5 microns at the base. The precisely shaped features of Example 16 consisted of four sided sharp tipped pyramids, 73.5% of the pyramids having a square base with a base length 146 microns and a height of 73 microns (primary feature), 2% of the pyramids having a square base with a base length 122 microns and a height of 61 microns and 25.5% of the pyramids having a rectangular base with a length of 146 microns, a width of 122 microns and a height 73 (secondary features). The pyramids were arranged in a grid pattern, per FIGS. 5a and b; all spacing between pyramids was 5 microns at the base.

Figure 2:
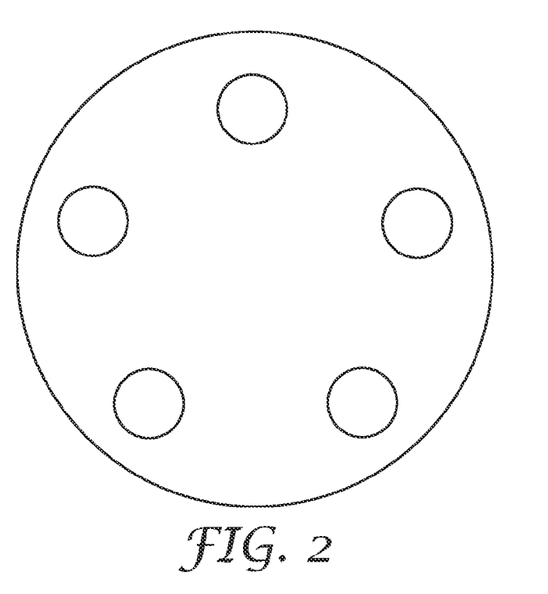
FIG. 2 is a top view of an abrasive article including abrasive elements of the present invention arranged in a star pattern.
Figure 6:
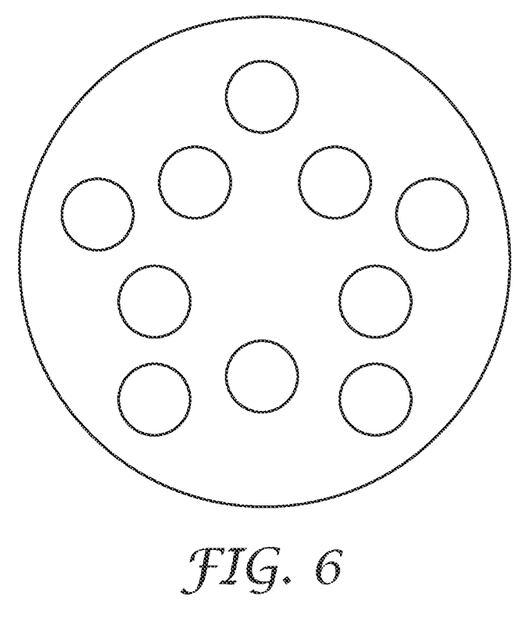
FIG. 6 is a top view of an abrasive article including abrasive elements of the present invention arranged in a double star pattern.

Five abrasive elements were prepared for each of Examples 14 and 15, and ten abrasive elements were prepared for Example 16. The abrasive elements were coated with CVD diamond, by the process previously described. The CVD diamond coated abrasive elements were then used to form abrasive articles, using the fabrication procedure described in Example 12. The abrasive articles fabricated from the abrasive elements of Examples 14 and 15 were arranged in a circular pattern, such that their center points were positioned along the circumference of a circle with a radius of about 1.75 inch (44.5 mm) and spaced apart equally at about 72° around the circumference, FIG. 2. These abrasive articles are designated as Examples 14A and Example 15A, respectively. The ten abrasive elements of Example 16 were used to fabricate an abrasive article, designated Example 16A, having the abrasive elements arranged in a double star pattern, as shown in FIG. 6. The larger star pattern was identical to that of Examples 14 and 15. The elements of the smaller star pattern were arranged in a circular pattern, such that their center points were positioned along the circumference of a circle with a radius of about 1.5 inch (38.1 mm) and spaced apart equally at about 72° around the circumference, as shown in FIG. 2. These elements were offset by 36° relative to the outside elements.

TABLE 3

Precisely Shaped Feature Parameters of Examples 14-16.

| Example | Base Length (microns) | Spacing (microns) | Primary Feature Height (microns) | Offset Height (microns) | Primary Features (%) | Feature Tip |
|---|---|---|---|---|---|---|
| 14 | 390 | 5 | 195 | 12 | 74 | Sharp |
| 15 | 146 | 59 | 61 | 12 | 74 | Truncated |
| 16 | 146 | 5 | 73 | 12 | 74 | Sharp |

Comparative Example 17 (CE17)

CE17 was a diamond grit pad conditioner, having a diamond size of 180 microns, available under the trade designation "3M DIAMOND PAD CONDTIONER A2812" from 3M Company, St. Paul, Minn.

Comparative Example 18 (CE18)

CE18 was a diamond grit pad conditioner, having a diamond size of 250 microns, available under the trade designation "3M DIAMOND PAD CONDTIONER A165" from 3M Company.

Comparative Example 19 (CE19)

CE19 was a diamond grit pad conditioner, having a diamond size of 74 microns, available under the trade designation "3M DIAMOND PAD CONDTIONER H2AG18" from 3M Company. Comparative Example 20 (CE20)

CE20 was a diamond grit pad conditioner, having a diamond size of 74 microns, available under the trade designation "3M DIAMOND PAD CONDTIONER H9AG27" from 3M Company.

CMP Polishing Tests Using Example 14A, CE17 and CE18

Using Polishing Test Method 1, the two abrasive articles of Example 14A were tested as pad conditioners in a copper CMP process using a relatively hard CMP pad, IC1010. One abrasive article was tested at a wafer head pressure of 3 psi, while the other was tested at a wafer head pressure of 1.4 psi. Using the Copper Wafer Removal Rate and Non-Uniformity Test Method described above, the copper removal rate and wafer non-uniformity were measured as a function of conditioning time. Results are shown in Table 4. For both the low head pressure and high head pressure processes, good, stable removal rates and good, stable wafer non-uniformities were obtained. The precisely shaped feature tips were examined by optical microscopy after the polishing. The wear of the feature tips was very minor after the 20.8 hour test CMP polishing test, indicating that conditioner would have a long life.

TABLE 4

Copper CMP Polishing Results for Example 14A.

| | Head Pressure 3.0 psi | | Head Pressure 1.4 psi | |
|---|---|---|---|---|
| Conditioning Time (hr) | Removal Rate (Å/min) | NU (%) | Removal Rate (Å/min) | NU (%) |
| 0.58 | 10,268 | 2.9 | 4,591 | 5.8 |
| 2.8 | 10,457 | 3.3 | 4,601 | 6.5 |
| 5.03 | 10,387 | 3.4 | 4,701 | 5.3 |
| 7.27 | 10,208 | 3.9 | 4,608 | 3.9 |
| 9.5 | 9,943 | 4.1 | 4,640 | 4.6 |
| 11.73 | 9,873 | 4.1 | 4,609 | 4.7 |
| 13.97 | 9,756 | 4.6 | 4,533 | 4.5 |
| 16.2 | 9,738 | 4.8 | 4,538 | 4.7 |
| 20.67 | 9,711 | 4.0 | 4,394 | 4.9 |

Comparative Examples CE17 and CE18 were run in a similar test to that of Example 14A (3 psi wafer head pressure), except the polishing time was only 0.6 hours. Copper removal rate results and wafer non-uniformity are shown in Table 5.

TABLE 5

Copper CMP Polishing Results for Example 14A, CE17 and CE18.

| Example | Conditioning Time (hr) | Removal Rate (Å/min) | NU (%) |
|---|---|---|---|
| 14A | 0.6 | 10,478 | 6.6 |
| CE17 | 0.6 | 8,957 | 4.7 |
| CE18 | 0.6 | 8,791 | 6.3 |

CMP Polishing Tests Using Example 15A and CE19

Using Polishing Test Method 2, the two abrasive articles of Example 15A were tested as pad conditioners in a copper CMP process using a relatively soft CMP pad, WSP. One abrasive article was tested at a wafer head pressure of 3 psi, while the other was tested at a wafer head pressure of 1.4 psi. Using the Copper Wafer Removal Rate and Non-Uniformity Test Method described above, the copper removal rate and wafer non-uniformity were measured as a function of conditioning time. Results are shown in Table 6. For both the low head pressure and high head pressure processes, good, stable removal rates and good, stable wafer non-uniformities were obtained.

TABLE 6

Copper CMP Polishing Results for Example 15A.

| | Head Pressure 3.0 psi | | Head Pressure 1.4 psi | |
|---|---|---|---|---|
| Conditioning Time (hr) | Removal Rate (Å/min) | NU (%) | Removal Rate (Å/min) | NU (%) |
| 0.55 | 6,086 | 10.3 | 3,116 | 14.4 |
| 3.62 | 6,920 | 9.9 | 3,775 | 11.2 |
| 6.68 | 6,906 | 11.4 | 3,807 | 10.7 |
| 9.75 | 6,918 | 10.3 | 4,063 | 8.7 |
| 11.82 | 7,140 | 10.8 | 4,160 | 8.1 |
| 14.88 | 6,878 | 8.9 | 4,063 | 7.0 |
| 17.95 | 7,266 | 9.4 | 4,367 | 5.9 |
| 21.02 | 7,317 | 7.6 | 4,616 | 5.4 |

A diamond grit pad conditioner, CE19, was also tested using Polishing Test Method 2. The copper removal rate and wafer non-uniformity were measured as a function of conditioning time. Results are shown in Table 7. By the time the 6 hour polishing time was reached, the pads were severely worn and pad groves were no longer present, indicating that the polishing pad was completely worn by the diamond grit pad conditioner.

TABLE 7

Copper CMP Polishing Results for CE19.

| | Head Pressure 3.0 psi | | Head Pressure 1.4 psi | |
|---|---|---|---|---|
| Conditioning Time (hr) | Removal Rate (Å/min) | NU (%) | Removal Rate (Å/min) | NU (%) |
| 0.55 | 8,118 | 8 | 4,967 | 7.5 |
| 3.62 | 8,265 | 9.7 | 5,382 | 8.2 |
| 6.68 | 7,191 | 9.6 | 4,484 | 13.5 |

The pads from the CMP polishing tests run at a wafer head pressure of 3.0 psi, which were conditioned with Example 15A and CE19, were measured for pad wear rate and surface roughness, using the previously described test methods. Results are shown in Table 8. The average pad wear rate of the pad conditioned with Example 15A was about a factor of 4 lower than the pad conditioned with CE19, indicating pads conditioned with the conditioner having precisely shaped abrasive features would have a significantly longer useful life.

TABLE 8

Pad Wear Results from CMP Polishing Tests with Example 15A and CE19.

| Example | Conditioning Time (hr) | Pad Wear Rate (micron/hr) | Initial Average Pad Surface Roughness (microns) | Final Average Pad Surface Roughness (microns) |
|---|---|---|---|---|
| Ex 15A | 21.02 | 34.8 | 2.34 | 2.50 |
| CE19 | 6.68 | 132.4 | 1.96 | 2.66 |

CMP Polishing Tests Using Example 16A and CE20

Using Polishing Test Method 3, the abrasive article of Example 16A was compared to diamond grit pad conditioner, Comparative Example CE20, in an oxide process. Using the Oxide Wafer Removal Rate and Non-Uniformity Test Method described above, the oxide removal rate and wafer non-uniformity were measured as a function of conditioning time. Results are shown in Table 9. Higher removal rates and lower wafer non-uniformity were obtained when the polishing process employed a pad conditioner Example 16A with precisely shaped features compared to conventional diamond grit pad conditioner CE20. The pad surface finish was measured at 3 (7.6 cm) inches, 7 inches (17.8 cm) and 13 inches (33.0 cm) from the pad center after 4.9 hours of conditioning. The pad surface finish for Example 16A was slightly higher than Comparative Example CE20 (8.47 microns versus 7.24 microns, respectively). The starting pad surface roughness was 12 microns. The polishing test with Example 16A as the pad conditioner was continued out to 30 hours. The feature heights of the abrasive elements were measured by conventional optical microscopy before and after polishing to determine the tip wear. The wear rate was determined to be about 0.1 micron/hr. There were no stains or slurry build-up on the features.

TABLE 9

Oxide CMP Polishing Results for Example 16A and CE20.

| | Example 16A | | CE20 | |
|---|---|---|---|---|
| Conditioning Time (hr) | Removal Rate (Å/min) | NU (%) | Removal Rate (Å/min) | NU (%) |
| 0.6 | 4,673 | 5 | 2,021 | 6.1 |
| 1.7 | 5,422 | 5.7 | 2,391 | 8.1 |
| 2.8 | 5,482 | 2.2 | 2,615 | 8.1 |
| 3.8 | 5,556 | 1.6 | 2,692 | 7.6 |
| 4.9 | 5,490 | 3.5 | 2,910 | 7.6 |

Although the present invention has been described with reference to preferred embodiments, workers skilled in the art will recognize that changes may be made in form and detail without departing from the spirit and scope of the invention.

What is claimed is:

1. An abrasive element precursor comprising:
    a green body ceramic element having a first major surface and a second major surface; wherein the green body ceramic element includes a plurality of inorganic particles, a binder and a carbon source and wherein the plurality of inorganic particles, the binder and the carbon source form a mixture in the form of a dried ceramic-binder powder;
    wherein at least the first major surface comprises a plurality of precisely shaped features;
    wherein the plurality of inorganic particles are at least about 99% carbide ceramic by weight; and
    wherein the binder is a thermoplastic with a $T_g$ of less than about 25° C.

2. The abrasive element precursor of claim 1, wherein the green body ceramic element further comprises a lubricant.

3. The abrasive element precursor of claim 1, wherein the inorganic particles are selected from the group consisting of: silicon carbide, boron carbide, zirconium carbide, tungsten carbide or combinations thereof.

4. The abrasive element precursor of claim 1, wherein the inorganic particles comprise at least about 90% silicon carbide by weight.

5. The abrasive element precursor of claim 1, wherein at least some of the plurality of precisely shaped features have a length, along at least one base edge, from about 1 micron to about 2,000 microns and an areal density from about 1 feature/mm² to about 1,000 features/mm².

6. The abrasive element precursor of claim 5, wherein the length of at least some of the plurality of precisely shaped features, along at least one base edge, is from about 10 microns to about 300 microns and the areal density is from about 10 features/mm² to about 300 features/mm².

7. The abrasive element precursor of claim 1, wherein the carbon source is selected from the group consisting of: phenolic resin, cellulose compounds, sugars, graphite, carbon black and combinations thereof.

8. The abrasive element precursor of claim 1, wherein the thermoplastic has a $T_g$ of less than about 0° C.

9. The abrasive element precursor of claim 1, wherein the green body ceramic element is substantially free of oxide sintering aides.

10. The abrasive element precursor of claim 1, wherein the number of defective precisely shaped features is less than about 5% of the total number of precisely shaped features.

11. A method of making an abrasive element precursor comprising:
    providing a mold having a plurality of precisely shaped cavities;
    providing a mixture comprising a plurality of inorganic particles, a binder, and a carbon source, wherein the mixture is in the form of spray dried agglomerates and wherein the plurality of inorganic particles are at least about 99% carbide ceramic by weight; and
    forming a green body ceramic element having first and second major surfaces, wherein at least the first major surface comprises a plurality of precisely shaped features, and wherein the green body ceramic element comprises a plurality of inorganic particles, a binder, and a carbon source, wherein the plurality of inorganic particles are at least about 99% carbide ceramic by weight, and wherein the binder is a thermoplastic with a $T_g$ of less than about 25° C.;
    wherein forming the green body ceramic element further comprises filling a majority of the cavities with the mixture.

12. The method of claim 11, wherein a number of defective precisely shaped features is less than about 5% of the total number of precisely shaped features.

13. The method of claim 11, wherein the green body ceramic element has a feature non-uniformity of less than about 20% of a feature height.

14. The method of claim 11, wherein the mixture is substantially free of oxide sintering aides.

15. The method of claim 11, wherein the green body ceramic element is formed using ceramic dry pressing.

16. The method of claim 11, wherein forming the green body ceramic element further comprises:
    providing a die cavity;
    filling the die cavity with the mixture;
    placing the mold in the die cavity such that a majority of the precisely shaped cavities of the mold are filled with the mixture; and
    applying pressure to the mixture to compact the mixture into the precisely shaped cavities.

17. A method of forming an abrasive element comprising:
    providing a mold having a plurality of precisely shaped cavities;
    providing a mixture comprising a plurality of inorganic particles, a binder, and a carbon source, wherein the mixture is in the form of spray dried agglomerates and wherein the plurality of inorganic particles are at least about 99% carbide ceramic by weight;
    forming a green body ceramic element having first and second major surfaces, wherein at least the first major surface comprises a plurality of precisely shaped features, wherein the green body ceramic element comprises a plurality of inorganic particles, a binder, and a carbon source, wherein the plurality of inorganic particles are at least about 99% carbide ceramic by weight, based on the total weight of the mixture, wherein the binder is a thermoplastic with a $T_g$ of less than about 25° C., and wherein forming the green body ceramic element further comprises filling a majority of the cavities with the mixture;
    removing the green body ceramic element from the mold; and
    heating the green body ceramic element to cause sintering of the inorganic particles.

18. The method of claim 17, further comprising coating the plurality of precisely shaped features after sintering of the inorganic particles.

19. The method of claim 18, wherein the coating is selected from one of diamond, doped diamond, diamond like carbon, diamond like glass, silicon carbide, silicon nitride, tungsten carbide, titanium nitride, cubic boron nitride, anti-corrosion coatings, surface modifying coatings, hydrophobic or hydrophilic coatings, polymeric coatings, fluorochemical coatings, particle coatings, polycrystalline diamond, microcrystalline diamond, nanocrystalline diamond and combinations thereof.

20. The method of claim 18, wherein the coating is applied by a chemical vapor deposition process or a physical vapor deposition process.

21. The method of claim 17, wherein the mixture is substantially free of oxide sintering aides.

22. The method of claim 17, wherein a number of defective precisely shared features is less than about 5% of the total number of precisely shaped features.

23. The method of claim 17, wherein the precisely shaped abrasive element has a feature non-uniformity of less than about 20% of a feature height.

24. The method of claim 17, wherein the abrasive element has a porosity of less than about 5% and a grain size less than about 5 microns.

25. The abrasive element precursor of claim 1, wherein the carbon source is present in the green body ceramic element in an amount of between about 2 and 7% by weight, based on the total weight of the green body ceramic element.

26. An abrasive element precursor comprising:
a green body ceramic element having a first major surface and a second major surface; wherein the green body ceramic element includes a plurality of inorganic particles, a binder and a carbon source and wherein the plurality of inorganic particles, the binder and the carbon source form a mixture in the form of a dried ceramic-binder powder;
wherein at least the first major surface comprises a plurality of precisely shaped features;
wherein the plurality of inorganic particles are at least about 99% carbide ceramic by weight; and
wherein the inorganic particles comprise at least about 90% silicon carbide by weight.

* * * * *

UNITED STATES PATENT AND TRADEMARK OFFICE
CERTIFICATE OF CORRECTION

PATENT NO. : 9,956,664 B2  
APPLICATION NO. : 14/418960  
DATED : May 1, 2018  
INVENTOR(S) : Duy Lehuu et al.

Page 1 of 1

It is certified that error appears in the above-identified patent and that said Letters Patent is hereby corrected as shown below:

On the Title Page

Column 1, Line 5, Title, and in the Specification, Column 1, Line 3, delete "METHODS" and insert -- METHOD --, therefor.

In the Specification

Column 20, Lines 43-44, delete "Comparative Example 20 (CE20)" and insert the same on Column 20, Line 44, as a heading.

Signed and Sealed this  
Eleventh Day of December, 2018

Andrei Iancu  
*Director of the United States Patent and Trademark Office*